US010777787B2

(12) United States Patent
Reingruber et al.

(10) Patent No.: US 10,777,787 B2
(45) Date of Patent: Sep. 15, 2020

(54) BATTERY

(71) Applicant: NORDFELS GMBH, Bad Leonfelden (AT)

(72) Inventors: Martin Reingruber, Vorderweißenbach (AT); Edmund Jenner-Braunschmied, Zwettl an der Rodl (AT)

(73) Assignee: VOLTLABOR GMBH, Bad Leonfelden (AT)

( * ) Notice: Subject to any disclaimer, the term of this patent is extended or adjusted under 35 U.S.C. 154(b) by 90 days.

(21) Appl. No.: 16/083,941

(22) PCT Filed: Mar. 14, 2017

(86) PCT No.: PCT/EP2017/056043
§ 371 (c)(1),
(2) Date: Sep. 11, 2018

(87) PCT Pub. No.: WO2017/157968
PCT Pub. Date: Sep. 21, 2017

(65) Prior Publication Data
US 2019/0334134 A1    Oct. 31, 2019

(30) Foreign Application Priority Data
Mar. 14, 2016  (EP) ...................................... 1616009

(51) Int. Cl.
*H01M 2/20* (2006.01)
*H01M 2/10* (2006.01)
(Continued)

(52) U.S. Cl.
CPC ....... *H01M 2/1016* (2013.01); *H01M 2/1223* (2013.01); *H01M 2/202* (2013.01);
(Continued)

(58) Field of Classification Search
CPC ............. H01M 2/1016; H01M 10/613; H01M 10/615; H01M 10/643; H01M 10/653;
(Continued)

(56) References Cited

U.S. PATENT DOCUMENTS

2002/0138971 A1* 10/2002 Onishi ................ H01M 2/0277
29/623.1
2006/0204840 A1*  9/2006 Jeon .................... H01M 2/1077
429/152

(Continued)

FOREIGN PATENT DOCUMENTS

DE    102007063178 A1    6/2009
EP        2475025 A1    7/2012
EP        2564448 B1    3/2013

OTHER PUBLICATIONS

International Search Report and Written Opinion, dated May 17, 2017 received in PCT/EP2017/056043, pp. 10.

*Primary Examiner* — Cynthia K Walls
(74) *Attorney, Agent, or Firm* — Liang & Hennessey; Brian E. Hennessey

(57) ABSTRACT

A battery is provided that includes a plurality of electrically coupled battery modules. Each battery module includes a plurality of combined battery cells having positive and negative poles arranged at opposing end faces of the battery module. Each battery module also includes a busbars electrically connecting said positive poles and a busbar connecting said negative poles. The battery includes an electrical insulation and a heat conducting plate arranged at one end face of the battery modules for cooling and/or heating the battery cells thereof. The heat conducting plate is provided at an end face of the battery modules that includes poles of the battery cells. The electrical insulation, which is formed as a thermal contact element, is located between the busbars of the battery modules and the heat conducting plate. The (Continued)

positive and negative poles of the battery cells are located on opposing end faces of each battery module.

19 Claims, 3 Drawing Sheets

(51) Int. Cl.
  *H01M 10/613* (2014.01)
  *H01M 10/615* (2014.01)
  *H01M 10/643* (2014.01)
  *H01M 10/653* (2014.01)
  *H01M 10/6556* (2014.01)
  *H01M 10/6567* (2014.01)
  *H01M 2/12* (2006.01)
(52) U.S. Cl.
  CPC ....... *H01M 10/613* (2015.04); *H01M 10/615* (2015.04); *H01M 10/643* (2015.04); *H01M 10/653* (2015.04); *H01M 10/6556* (2015.04); *H01M 10/6567* (2015.04)

(58) Field of Classification Search
  CPC ......... H01M 10/6556; H01M 10/6567; H01M 2/1223; H01M 2/202; H01M 10/6554; H01M 2/1235; H01M 2/105
  See application file for complete search history.

(56) References Cited

U.S. PATENT DOCUMENTS

| 2009/0297892 | A1 | 12/2009 | Mujeeb et al. | |
|---|---|---|---|---|
| 2011/0293998 | A1 | 12/2011 | Sato et al. | |
| 2012/0177960 | A1* | 7/2012 | Tasai | B60H 1/00278 429/72 |
| 2013/0230761 | A1* | 9/2013 | Okutani | H01M 2/206 429/158 |
| 2014/0242436 | A1* | 8/2014 | Pyzza | H01M 2/1016 429/120 |
| 2014/0295242 | A1* | 10/2014 | Kimura | H01M 2/1072 429/120 |

* cited by examiner

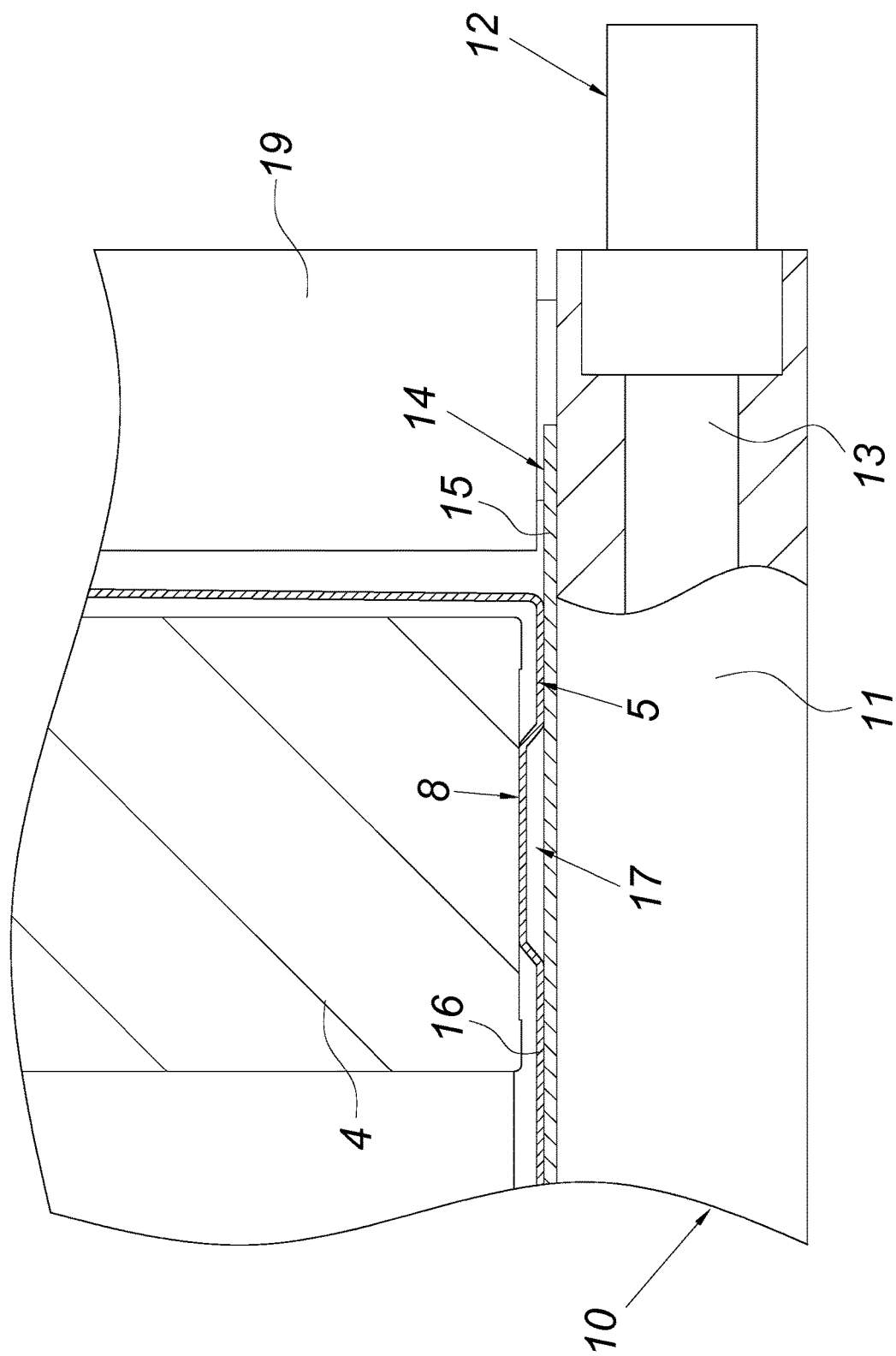

BATTERY

CROSS-REFERENCE TO RELATED APPLICATIONS

This application is a national phase application of PCT Application No. PCT/EP2017/056043, filed Mar. 14, 2017, entitled "BATTERY", which claims priority to EP16160091.1, dated Mar. 14, 2016, and which is incorporated by reference in its entirety.

BACKGROUND

1) Field of the Invention

The invention relates to a battery comprising a plurality of electrically coupled battery modules, each comprising a plurality of combined battery cells having electrical poles, arranged at least at one end face of the battery module, as well as a plurality of busbars electrically connecting said poles, comprising electrical insulation and comprising a heat conducting plate arranged at the end face of the battery modules for cooling and/or heating the battery cells thereof.

2) Description of Related Art

To cool the battery cells of a battery, it is known (EP2564448B1) to fix the bottom, i.e. the lower end face, of the battery modules, consisting of combined battery cells, to a heat conducting plate. The heat conducting plate comprises cooling conduits through which coolant flows, as a result of which the battery cells can be actively cooled. The poles of the battery cells are arranged on the upper end face of the battery modules and are electrically interconnected by means of busbars (often also referred to as cell connectors/cell connector boards), corresponding to the battery cells being connected in parallel or in series. By cooling the battery cells at the bottom in this manner, the temperature of the battery cells can be controlled; however, cooling of this kind is relatively sluggish due to the insulating housing of the battery cells. Therefore, temperature peaks in the battery cells, caused for example by a high electrical power request, are compensated for relatively sluggishly, which can have an adverse effect on the performance and even the service life of the battery cells and thus of the battery.

In addition, to cool the tops of batteries, it is known (DE102007063178A1) to provide a cooling plate between the poles of the battery cells and the power strip. By means of the thermal contact between the metal poles and the cooling plate, increased heat dissipation can be ensured; however, the design of a battery of this kind is comparatively complex and also requires relatively complex maintenance due to the mechanical connections.

SUMMARY OF THE INVENTION

Against this background, the object of the invention is to improve the stability of a battery having a plurality of battery modules of the type mentioned at the outset, and specifically in a structurally simple manner. In addition, the battery should have a high power density.

The invention achieves the object by the heat conducting plate being arranged at the end face of the battery module that comprises poles of the battery cells, the electrical insulation, which is formed as a thermal contact element, being located between the busbar of the battery module and the heat conducting plate.

When the heat conducting plate is provided at the end face of the battery module that comprises poles of the battery cells, with the electrical insulation, which is formed as a thermal contact element, being located between the busbar of the battery module and the heat conducting plate, first of all the temperature of the battery cells can be controlled more effectively since it is possible to obtain a better heat transfer from heat conducting plate to battery cells and vice versa by means of the metal and thus relatively good heat-conducting poles of the battery cells. In this way, temperature peaks owing to a relatively high output and/or a high charging power of the battery can be dissipated from the battery cells quickly and reliably; this can significantly improve the stability of the battery.

Unlike in the prior art however, a heat conducting plate provided in this design does not adversely affect the structurally simple, modular construction of the battery. According to the invention, it is proposed specifically that the heat conducting plate is not integrated in the battery module grouping, which comprises battery cells and busbars, as is known from batteries which are cooled from the top. Instead, the heat conducting plate is separate from the battery module and arranged downstream of the electrical insulation in the battery. Since the electrical insulation is also formed as a thermal contact element, this modular construction of the battery does not disrupt the thermal conductivity between the battery cells and heat conducting plate any further either.

In addition, this design according to the invention makes it possible for the temperature of a plurality of battery modules to be controlled actively by means of a common heat conducting plate, which not only further reduces the structural complexity of the battery, but also allows for relatively high power densities.

The structural conditions can be simplified and the maintainability increased if the electrical insulation is formed as a heat conducting foil.

The tempering of the poles can be improved if the busbar comprises a metal sheet extending beyond the poles of the battery cells.

If the metal sheet is electrically connected to the poles of the battery cells by means of protruding contact regions, material tolerances and thermal expansion and/or contraction can be absorbed by means of deformations at the protruding contact region. The risk of losing the thermal contact between the busbar and heat conducting plate can thus be considerably reduced.

It can be made easier to provide a compact busbar for coupling the battery cells if the battery cells comprise electrical poles at both end faces of their respective battery modules. In addition, one busbar per end face of the battery module is then sufficient.

If the battery cells each comprise a safety valve, which safety valves are provided at a common end face of their respective battery modules, the operational safety of the battery cells can be prevented from being jeopardised by providing the heat conducting plate at the opposite end face to said common end face. Specifically, the heat conducting plate is thus not in the flow path of the battery cells when they are degassing.

The design of the battery can be simplified further if the battery cells are formed as round cells.

The design of the battery can be simplified further if the heat conducting plate is formed as a load-bearing component of the battery to which the battery modules are attached. In addition, the torsional strength of the battery modules can be significantly increased as a result, which can further increase the mechanical stability of the battery.

If the battery modules comprise spacers that extend in the longitudinal direction of the battery cells and by means of which the battery modules are attached to the heat conducting plate, the preload forces in the battery cells due to potential attachment means can be relieved. Among other things, this protects the electrical connections between the poles of the battery cells and the busbar. The stability of the battery can thus be increased further.

The battery modules can be wired relatively simply if the battery modules comprise contact surfaces that are electrically connected to the busbars and arranged on opposite longitudinal sides of each battery module and at the same end face. As a result, by subsequently lining them up at their longitudinal sides, it may be possible, for example, to electrically connect the battery modules by means of the thus formed, mutually facing contact surfaces of the two battery modules. This can further simplify the modular design of the battery, which can make assembly and maintenance of the battery more simple.

If the battery modules comprise a cell holder for the battery cells on the opposite end face to the heat conducting plate, this can improve the mechanical connections in the battery modules.

The cooling/heating action of the heat conducting plate can be improved if said heat conducting plate comprises active cooling and/or heating means. The heating/cooling means can be part of a hydraulic flow, but of course can also conceivably be electrical heating systems, Peltier elements, condensers of a coolant circuit, etc.

BRIEF DESCRIPTION OF THE DRAWINGS

The drawings show an example of the subject matter of the invention on the basis of a variant. They show:

FIG. 3, a view of a detail of FIG. 2.

DETAILED DESCRIPTION

Figure 1:
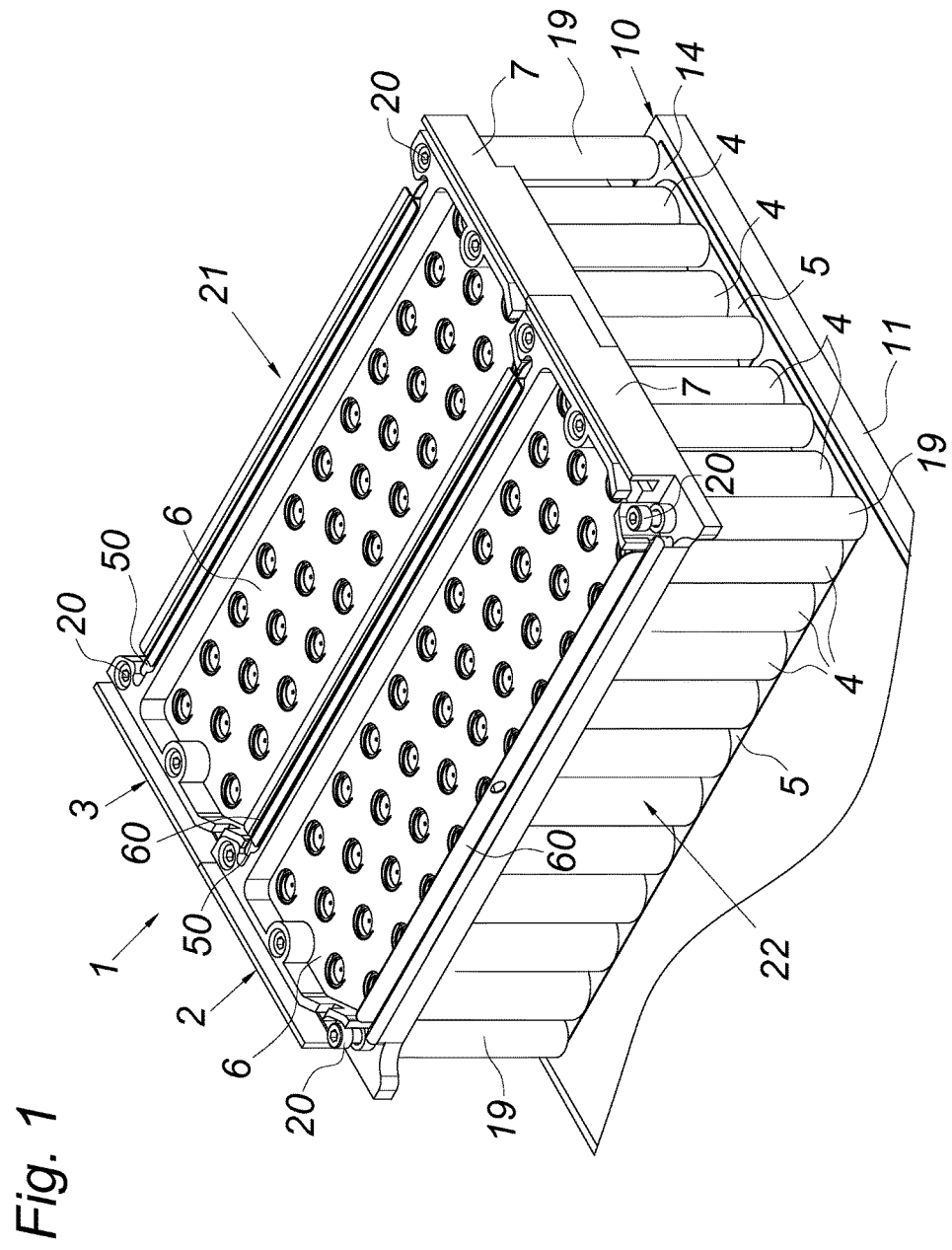
FIG. 1, a three-dimensional view of a battery shown in part.

FIG. 1 shows a battery 1, by way of example, comprising a plurality of battery modules 2, 3, which battery modules 2, 3 are electrically coupled. The battery modules 2, 3 each comprise mechanical and electrical connections consisting of combined battery cells 4, metal busbars 5, 6 and a cell holder 7, which is preferably made of plastics material. The battery cells 4 protrude into holes (not shown in more detail) in the cell holder 7, as a result of which said cell holder 7 receives the battery cells 4 in a form fit and thus secures or supports said cells, as can be seen in FIG. 1; this ensures high mechanical stability in the battery modules 2, 3. The electrical poles 8, 9, specifically the positive pole 9 and negative pole 8, are arranged at opposite end faces 30, 31 of the battery modules 2, 3 and electrically joined, i.e. electrically connected, to the busbars 5 and 6 provided there, which busbars 5 and 6 function as cell connectors/cell connector boards for the battery cells 7 in each battery module 2, 3.

In addition, the battery 1 comprises a load-bearing structural component 10 formed as a metal heat conducting plate 11. This heat conducting plate 11 is provided on the end face of the battery modules 2, 3, in this example on the lower end face 30, i.e. on the bottom of the battery modules 2, 3. The battery cells 4 of the battery modules 2, 3 are thermally connected to the heat conducting plate 11, which is designed to cool and/or heat the battery cells 4. For this purpose, the heat conducting plate 11 is thermally loaded by means of heating/cooling means 12.

Figure 2:
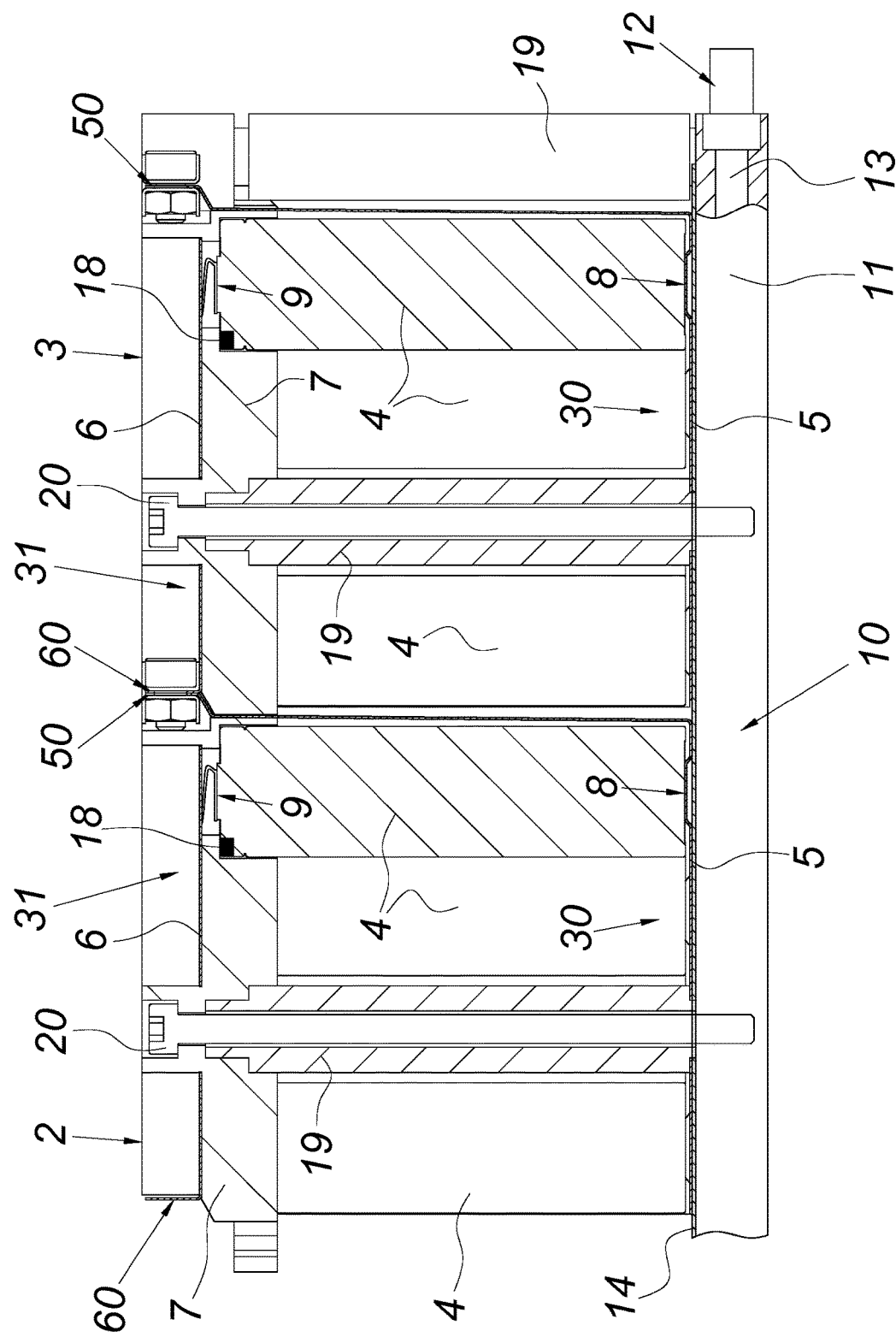
FIG. 2, a sectional view according to II-II in FIG. 1.

As can be seen from FIG. 2, the heat conducting plate 11 comprises active heating/cooling means 12 in the form of liquid lines 13 in the heat conducting plate 11, through which lines a heat transfer medium (not shown in more detail) is conducted for controlling the temperature of the battery cells 4. Passive heating/cooling means, such as heat conducting ribs (not shown in more detail) are of course also conceivable alternatively to or in combination with active heating/cooling means 12.

To advantageously thermally couple the battery cells 4 to the heat conducting plate 11, according to the invention the heat conducting plate 11 is provided on the lower end face 30 of the battery modules 2, 3, which comprises poles 8 of the battery cells 4. As a result, thermal energy can be supplied to or removed from the battery cells 4 particularly rapidly by means of the metal conductivity of the poles 8. The heat conducting plate 11 is thermally coupled to the negative poles 8, and specifically by means of electrical insulation 14 and the busbar 5, which is connected to the pole 8 of each battery cell 4, as can be seen in detail in FIG. 3. For this purpose, the electrical insulation 14 is formed as a thermal contact element for reducing the thermal resistance.

In addition, an electrical short circuit between the battery cells 4 and the battery modules 2, 3 can be prevented by means of the electrical insulation 14. The modular design of the battery 1 can therefore be retained, even if the battery modules 2, 3 are cooled together by an electrically conductive heat conducting plate 11. A stable and structurally simple modular battery 1 is thus produced.

As can be seen in FIG. 1, the electrical insulation 14 is relatively thin, which is made possible by using a heat conducting foil 15. It is pointed out in general that any heat conducting pad is possible as a thermal contact element, for example silicone rubber foils, silicone mats, mica discs, ceramic discs, etc.

A shaped, preferably bent, electrically conductive metal sheet 16, for example a nickel plate, has proven effective, among others, as a metal busbar 5, 6 for increasing the mechanical load capacity of the battery module 2, 3. The metal sheet 16 extends beyond the poles 8, 9 of the battery cells 4, which both increases the heat capacity of the busbars 5, 6 and leads to a larger contact surface with the heat conducting plate 11.

In accordance with FIG. 3, a protruding contact region 17 can be seen on the metal sheet 16, said region being electrically connected to the negative pole 8 of the battery cell 4. This protruding contact region 17 can resiliently absorb vibrations, thermal expansion or contractions on the battery module 2, 3, etc., and thus helps increase the stability of the battery 1.

In FIG. 2, a safety valve 18 can be seen on each battery cell 4, specifically on the cell top thereof. All the safety valves 18 are provided on the top common end face 31 of the battery modules 2, 3. As is known, the safety valves 18 release excess pressure occurring within the battery cell, for example in the case of malfunctions. The heat conducting plate 11 is provided on the opposite end face 30 of each battery module 2, 3 to the upper common end face 31, i.e. to the end face arranged with the safety valves 18. This ensures that a gas flowing out of the battery cell 4 through the safety valve 18 can escape from the heat conducting plate 11 unhindered. Despite a heat conducting plate 11 being arranged on the end face, therefore, the safety of the battery 1 should not be reduced.

It can also be seen that the battery cells 4 are formed as round cells, resulting in high compactness and thus a high energy density in the battery 1.

The battery modules 2, 3 comprise (at their edges in the example shown) a plurality of spacers 19 that extend in the longitudinal direction of the battery cells 4 and comprise screw connections 20. By means of said spacers 19, the battery modules 2, 3 are thus attached to the heat conducting plate 11. The heat conducting plate 11 is therefore used not only to cool and/or heat the battery cells 4, but also forms a support for the battery modules 2, 3.

As can be seen in FIG. 2, the battery modules 2, 3 comprise contact surfaces 50, 60 that are electrically connected to the respective busbars 5, 6. The contact surfaces 50, 60 are arranged on the two opposite longitudinal sides 21, 22 of each battery module 2, 3 and at the same end face 31, specifically the upper end face. The battery modules 2, 3 can thus be connected in series in a relatively simple manner.

The invention claimed is:

1. A battery comprising a plurality of electrically coupled battery modules, each battery module comprising:
   a plurality of combined battery cells having positive poles and negative poles arranged at opposing end faces of the battery module; and
   a first busbar electrically connecting said positive poles and a second busbar connecting said negative poles, said battery comprising an electrical insulation and a heat conducting plate arranged at one of the opposing end faces of the battery modules for cooling and/or heating the battery cells thereof, the electrical insulation, which is formed as a thermal contact element, being located between one of the first busbar and the second busbar of the battery modules and the heat conducting plate;
   wherein the heat conducting plate is common to the plurality of electrically coupled battery modules.

2. The battery according to claim 1, wherein said electrical insulation is formed as a heat conducting foil.

3. The battery according to claim 1, wherein said busbars each comprises a metal sheet that extends beyond the poles of the battery cells on one end face of the battery modules.

4. The battery according to claim 3, wherein said metal sheet is electrically connected to said poles of the battery cells by means of protruding contact regions.

5. The battery according to claim 4, wherein the battery cells each comprise a safety valve, which safety valves are provided at another one of the opposing end faces of the battery modules, the other one of the opposing end faces being opposite the heat conducting plate.

6. The battery according to claim 1, wherein the battery cells are round cells.

7. The battery according to claim 1, wherein the heat conducting plate forms a load-bearing structural component for the battery, to which component said multiple battery modules are attached.

8. The battery according to claim 1, wherein the battery modules each comprise spacers that extend in the longitudinal direction of the battery cells and by means of which the battery modules are attached to the heat conducting plate.

9. The battery according to claim 1, wherein the battery modules each comprise contact surfaces that are electrically connected to the busbars and arranged on opposite longitudinal sides of each battery module and at the same end face thereof.

10. The battery according to claim 1, wherein on the end face opposite to the heat conducting plate, the battery modules comprise a cell holder for the battery cells.

11. The battery according to claim 1, wherein said heat conducting plate comprises active cooling and/or heating means.

12. The battery according to claim 1, wherein said conducting plate is located on that end faces of said opposing end faces on which the negative poles of the battery modules are located.

13. The battery according to claim 1, wherein said plurality of electrically coupled battery modules that are located on a common conducting plate are connected in series.

14. A battery comprising a plurality of electrically coupled battery modules, each battery module comprising:
   a plurality of combined battery cells having positive poles and the negative poles arranged at opposing end faces of the battery module;
   a busbar electrically connecting said positive poles and a busbar connecting said negative poles of the respective battery module, said battery comprising:
   an electrical insulation; and
   a heat conducting plate, said heat conducting plate being arranged at one end face of the battery modules for cooling and/or heating the battery cells thereof, wherein the heat conducting plate is provided at that end faces of the battery modules, which comprise poles of the battery cells, the electrical insulation, which is formed as a thermal contact element, being located between the busbar connecting said negative poles of the battery modules and the heat conducting plate, wherein said plurality of electrically coupled battery modules are located on the heat conducting plate and are connected in series;
   wherein the heat conducting plate is common to the plurality of electrically coupled battery modules.

15. The battery according to claim 14 wherein the heat conducting plate is provided at that end faces of the battery modules, which comprise the negative poles of the battery cells.

16. The battery according to claim 14, wherein the battery cells each comprise a safety valve, which safety valves are provided at another one of the opposing end faces of the battery modules, the other one of the opposing end faces being opposite the heat conducting plate.

17. The battery according to claim 14, wherein each battery module comprises two contact surfaces, one contact surface being connected to said busbar electrically connecting said positive poles and the other contact surface being connected to said busbar electrically connecting said negative poles, wherein said two contact surfaces are arranged on the two opposite longitudinal sides of said battery module.

18. The battery according to claim 17, wherein said two contact surfaces of each battery module are arranged at the end faces of the battery modules opposing the heat conducting plate, wherein the battery modules are lined up at their longitudinal sides, to electrically connect the battery modules by means of the thus formed, mutually facing contact surfaces of two adjacent battery modules.

19. A battery module comprising:
   a battery cell having a positive pole arranged at a first end face of the battery cell and a negative pole arranged at a second end face of the battery cell, the first end face opposing the second end face;
   a first busbar electrically connecting to the positive pole;
   a second busbar electrically connecting to the negative pole;

a heat conducting plate and an electrical insulation arranged at one of the positive pole and the negative pole;

wherein the electrical insulation forms a first thermal contact element located between the first busbar and the heat conducting plate when the heat conducting plate and the electrical insulation are arranged at the positive pole;

wherein the electrical insulation forms a second thermal contact element located between the second busbar and the heat conducting plate when the heat conducting plate and the electrical insulation are arranged at the negative pole; and wherein the heat conducting plate is common to a further battery cell electrically coupled to the battery cell.

\* \* \* \* \*

UNITED STATES PATENT AND TRADEMARK OFFICE
CERTIFICATE OF CORRECTION

PATENT NO. : 10,777,787 B2  Page 1 of 1
APPLICATION NO. : 16/083941
DATED : September 15, 2020
INVENTOR(S) : Martin Reingruber and Edmund Jenner-Braunschmied It is certified that error appears in the above-identified patent and that said Letters Patent is hereby corrected as shown below:

On the Title Page

Item (30) Foreign Application Priority Data, please delete "1616009", and insert --16160091.1--.

Signed and Sealed this
Fifteenth Day of December, 2020

Andrei Iancu
*Director of the United States Patent and Trademark Office*